United States Patent [19]

Ferguson et al.

[11] 4,186,763
[45] Feb. 5, 1980

[54] IRRIGATION SYSTEM

[76] Inventors: George R. Ferguson, Rte. 2, Clover, S.C. 29710; Eric D. Freeman, Rte. 1, Box 134, Lake Lure, N.C. 28746

[21] Appl. No.: 890,716

[22] Filed: Mar. 20, 1978

[51] Int. Cl.² ............................................. B05B 3/12
[52] U.S. Cl. .................................. 137/344; 137/615; 239/177; 285/136
[58] Field of Search ............... 137/344, 615; 239/177, 239/212, 213; 285/136

[56] References Cited

U.S. PATENT DOCUMENTS

| 3,690,343 | 9/1972 | Crane | 137/344 |
| 3,782,408 | 1/1974 | Martin | 137/344 |
| 3,978,882 | 9/1976 | Cornelius | 137/344 |
| 4,095,613 | 6/1978 | Townsend et al. | 137/344 |

Primary Examiner—Gerald A. Michalsky

[57] ABSTRACT

An irrigation system having a generally vertical water delivery pipe and a water distribution pipe extending horizontally from and communicating with the delivery pipe. The distribution pipe is driven in rotation around an axis defined by the water delivery pipe by a hydraulic fluid operated drive, while hydraulic fluid for actuating the drive is circulated between the drive and a pump or the like through a conduit system which includes a rotary joint encircling the axis defined by the delivery pipe.

4 Claims, 5 Drawing Figures

U.S. Patent  Feb. 5, 1980  Sheet 1 of 2  4,186,763
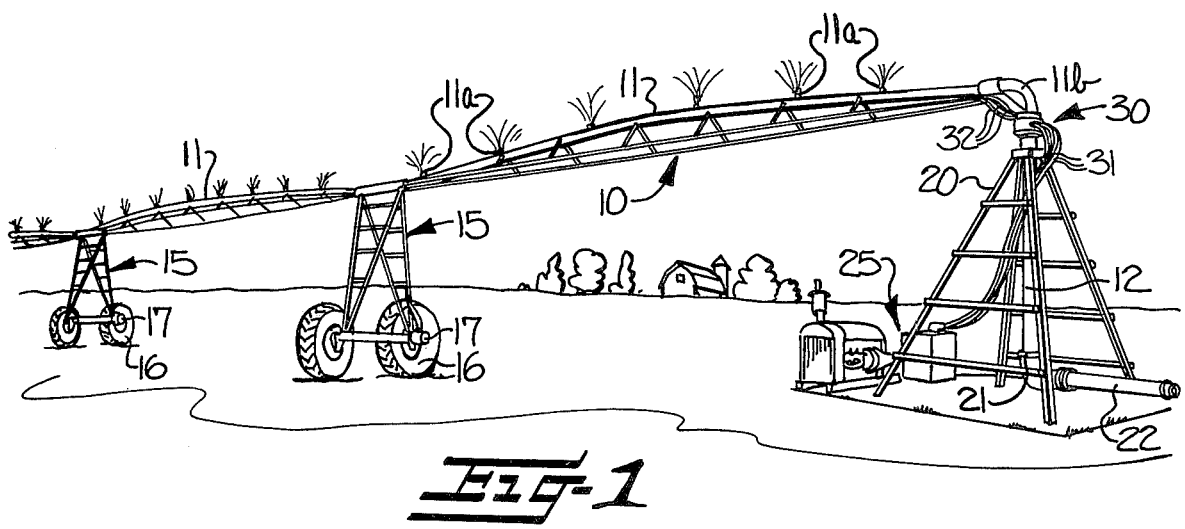
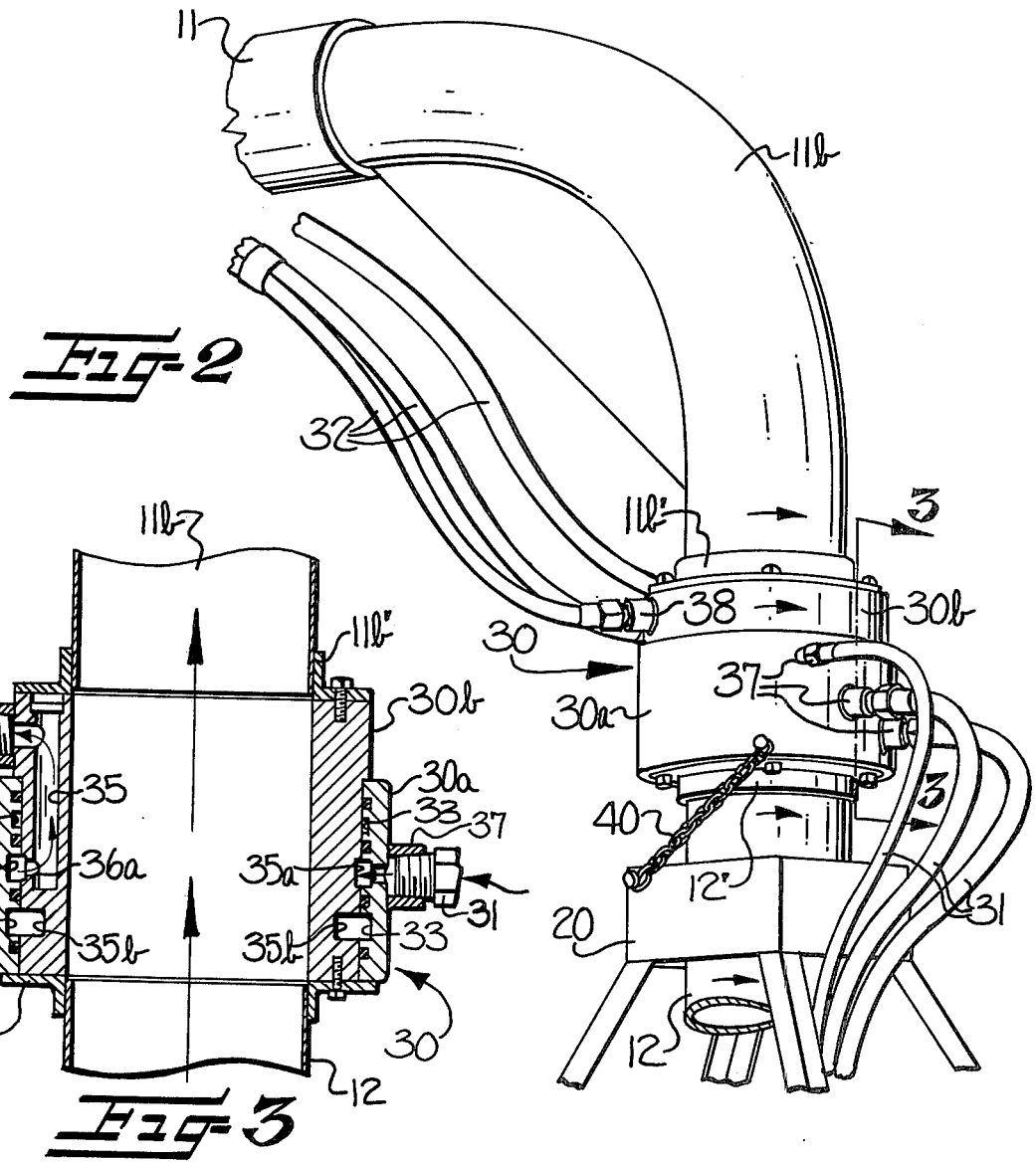

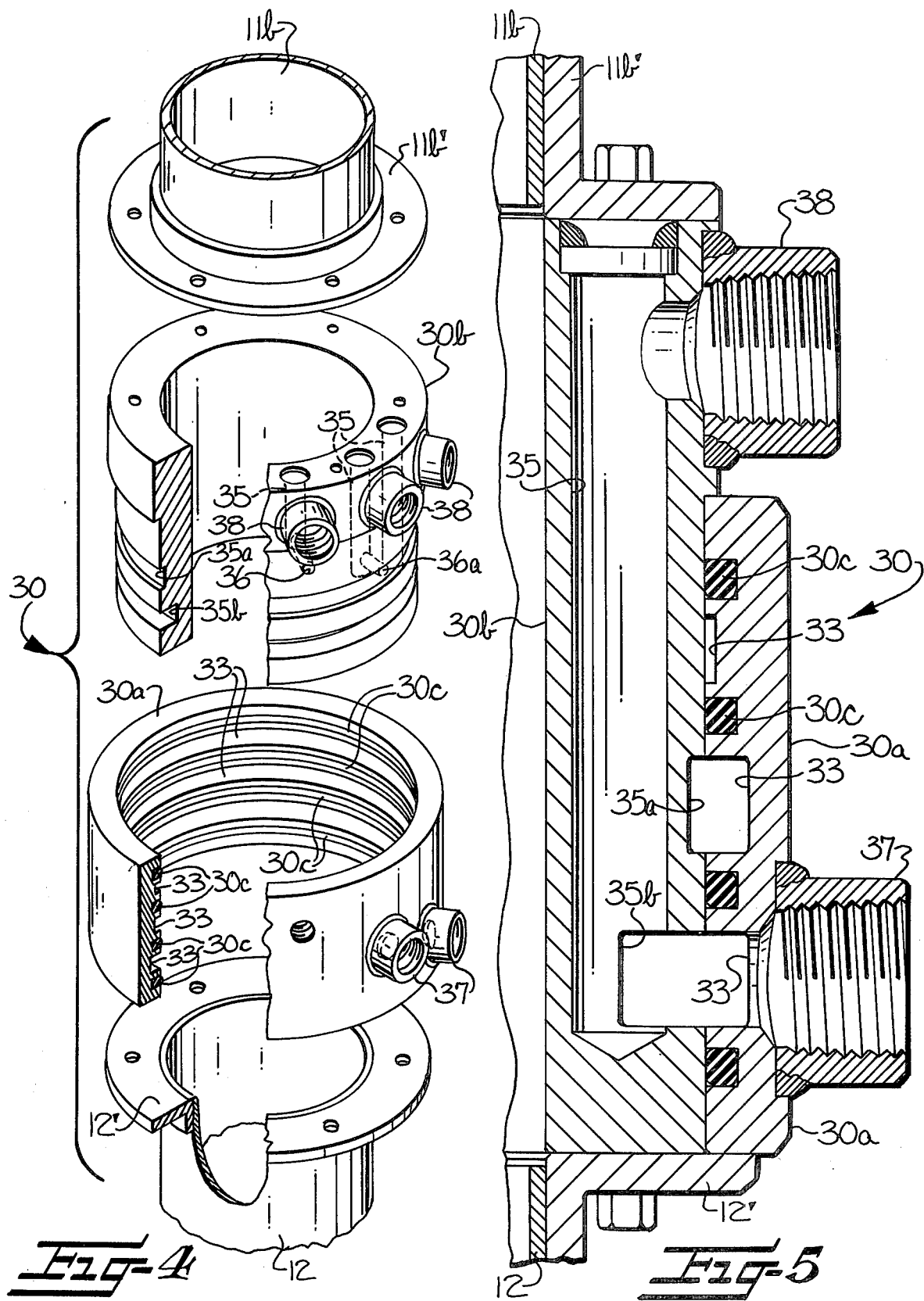

IRRIGATION SYSTEM

Agricultural irrigation systems have been proposed heretofore in which a circular area is irrigated by rotating a generally horizontal distribution pipe about an axis at the center of the area. The drives for rotating the distribution pipe have been proposed to include either electrical motors or hydraulic fluid operated motors. In instances where electrical motors have been employed, significant dangers and risks have arisen from supplying electrical power in a wet environment. Due to the electrocution of farm workers, electrically driven irrigation systems suffer from some disfavor.

While irrigation systems having hydraulic fluid actuated drives have not suffered from the risks of electrocution of workers, difficulties have been encountered in supplying the actuating hydraulic fluid. More particularly, it has been found preferable to supply actuating hydraulic fluid by circulating a flow of such fluid from a pump system or the like which is mounted stationarily near the center of the area being irrigated. Inasmuch as many such irrigation systems are based upon a relatively slow traverse of the area by the distribution pipe (on the order of one cycle or revolution per twenty-four hour period), it has been possible to accommodate the supply of hydraulic fluid by means of relatively long lengths of flexible hydraulic hose. Such a flexible hose, connecting the hydraulic fluid circulating means with the hydraulic fluid operated motor means, may be uncoupled, unwrapped from about the generally vertical water delivery pipe, and recoupled to reestablish hydraulic fluid circuits as required periodically. In fact, this practice has been widely followed by farm workers tending such irrigation systems. However, it will be appreciated that failure of a worker to tend such a system can result in destruction of the flexible hoses wrapped about the delivery pipe and resultant loss of hydraulic fluid. Even careful attention from a worker still results in loss of hydraulic fluid and interruptions in the otherwise continuous operation of the irrigation system.

With the aforementioned difficulties particularly in mind, it is an object of the present invention to facilitate the use of hydraulic fluid operated drives for circular irrigation systems of the general type described. In realizing this object of the present invention, the conduit system which establishes fluid communication between the hydraulic fluid circulating device and a drive motor includes a rotary joint encircling the axis of rotation defined by the delivery pipe. The rotary joint conducts hydraulic fluid flow between the dirve motor and the circulating pump during rotation of the distribution pipe of the irrigation system about the generally vertical water delivery pipe.

BRIEF DESCRIPTION OF THE DRAWINGS

FIG. 1 is a perspective view of a circular irrigation system embodying the invention;

FIG. 2 is an enlarged fragmentary view of a preferred embodiment of the improved rotary joint means for establishing fluid communication between a stationarily mounted hydraulic fluid circulating means and fluid operated drive motor means for the water distribution pipe of the circular irrigation system;

FIG. 3 is an enlarged fragmentary vertical sectional view taken substantially along line 3—3 in FIG. 2;

FIG. 4 is an exploded perspective view of the improved rotary joint means; and

FIG. 5 is an enlarged fragmentary view similar to the right-hand portion of FIG. 3, but illustrating two conduit connections angularly displaced with respect to those shown in FIG. 3.

DETAILED DESCRIPTION

Referring more specifically to the drawings, the numeral 10 broadly designates a substantially horizontal boom of an irrigation system and which carries a water distribution pipe 11 overlying an area to be irrigated. The water distribution pipe extends generally horizontally from and communicates with the upper terminal end of a generally vertical or upright water delivery pipe or standpipe 12 which defines a substantially vertical axis. Means are provided for supporting the water distribution pipe 11 for rotation about the axis of the water delivery pipe 12 and may include one or more wheeled carriages or towers 15 provided with ground engaging wheels 16. Each wheeled carriage 15 includes suitable hydraulic fluid operated drive motor means 17 drivingly connected to at least one of the ground engaging wheels thereof. Thus it can be seen that the hydraulic fluid operated drive motor means 17 is movable with and motivates rotation of the distribution pipe 11 about the axis of the water delivery pipe 12.

As shown in FIG. 1, the water distribution pipe 11 may include a series of yieldably or flexibly interconnected and intercommunicating pipe sections, as is conventional, with one of the wheeled towers 15 being positioned to support the distribution pipe at each juncture of adjacent pipe sections, as well as at the free end of the outermost pipe section. Of course, the distribution pipe 11 is provided with suitable sprinkler heads or water discharge openings 11a along its length, as is usual.

As best shown in the right-hand portion of FIG. 1 and in FIG. 2, a pipe fitting or connector 11b, shown in the form of a pipe elbow, serves for communicatively connecting the inner end of the water distribution pipe 11 to an end portion of the delivery pipe 12 which is, in turn, rotatably mounted in a supporting stand 20. Thus, pipe elbow 11b serves as an inner terminal end of the water distribution pipe and overlies the upper terminal end of the delivery pipe 12. The lower end portion of water delivery pipe 12 may be rotatably mounted on or coupled to a water supply line 22, as at 21. Water supply line 22 may be connected to a suitable source of water such as a well, pump or the like. A hydraulic fluid circulating means 25 is mounted stationarily relative to the rotatable water distribution pipe 11 for circulating a flow of hydraulic fluid to the drive motor means 17 of the wheeled towers 15, and a conduit means is provided for establishing fluid communication between the circulating means 25 and the drive motor means 17. According to the invention, such conduit means includes rotary joint means, broadly designated at 30, encircling the axis of the water delivery pipe 12 for conducting hydraulic fluid flow between the circulating means 25 and the drive motor means 17 during rotation of the distribution pipe 11 about the delivery pipe 12.

The conduit means for establishing fluid communication between the circulating means 25 and the drive motor means 17 further comprises flexible hose means including a plurality of hydraulic fluid-conveying stator conduit lines or tubes 31 and a corresponding plurality of hydraulic fluid-conveying rotor conduit lines or tubes 32. The stator lines 31 connect the hydraulic fluid circulating means 25 to a substantially stationary or stator element 30a of the rotary joint means 30, and the fluid-conveying rotor lines or tubes 32 connect a rotatable element or rotor element 30b of the rotary joint means 30 to the hydraulic fluid operated drive motor means 17. Thus, the hydraulic fluid-conveying rotor lines or tubes 32 are carried by or otherwise mounted for rotational movement with the distribution pipe 11.

In its preferrred embodiment, the improved rotary joint means 30, as shown herein, is interposed between and secured to axially aligned, spaced apart, rotatable pipe means represented by the proximal end portions of pipe elbow 11e and water delivery pipe 12. The stator and rotor elements 30a, 30b may be of annular or tubular form with the rotor element 30b extending coaxially of and being rotatable within, but in sealing or fluid-tight relation to, the stator element 30a. Suitable resilient sealing rings or O-rings 30c may be employed for effecting the desired fluid-tight seal between the proximal surfaces of the stator and rotor elements 30a, 30b.

In order to establish fluid communication between the hydraulic fluid-conveying stator lines 31 and the respective hydraulic fluid-conveying rotor lines 32, the inner peripheral surface of stator element 30a is provided with a plurality of axially spaced or longitudinally spaced peripheral grooves or annular passageways 33 therein corresponding in number to the number of stator lines 31, and each of which communicates with a respective longitudinally extending passageway 35 in the annular wall of rotor element 30b of the rotary joint means 30. In the disclosed embodiment of the invention, three stator lines 31 and three rotor lines 32 are illustrated in the drawings. Thus, the stator and rotor elements 30a, 30b of rotary joint means 30 are provided with three of the passageways 33, 35 therein, respectively.

Communication may be effected between the passageways 33 and the respective passageways 35 in any desired manner. By way of example, it will be observed in FIGS. 3–5 that the uppermost annular passageway 33 in stator element 30a is aligned with a port 36 leading to the shorter of the three longitudinal passageways 35 in rotor element 30b. The centermost of the three longitudinal passageways 35 has a port 36a leading therefrom to an annular passageway 35a in the outer surface of rotor element 30b and being aligned with the centermost annular passageway 33 in stator element 30a.

The lowermost of the three passageways 33 registers with another annular passageway 35b in the outer periphery of rotor element 30b and which is of such depth that it communicates directly with the longer of the three longitudinal passageways 35 as best shown in FIG. 5. The annular passageways 35a, 35b, may be desirable for increasing the effective cross-sectional area of the passageways 33 registering therewith.

The ends of the hydraulic fluid-conveying stator lines or tubes 31 remote from the hydraulic fluid circulating means 25 may be connected to the stator element 30a for communication with the respective annular passageways 33 therein by means of suitable conduit connections or pipe connectors 37. Similar pipe connectors 38 are secured to the rotor element 30b and project outwardly therefrom for communicatively connecting hydraulic fluid-conveying rotor lines or tubes 32 to the respective longitudinally extending passageways 35 within the annular wall of rotor element 30b (see FIGS. 3, 4 and 5). The tubular rotor element 30b may be suitably secured to the pipe elbow 11b and the vertical water delivery pipe 12 by any suitable means. In this instance, it will be observed that the proximal ends of the pipe elbow 11b and the water delivery pipe have respective flanges 11b' and 12' thereon to which opposite ends of the annular wall of the rotor element 30b are suitably secured. The bottom flange 12' may slidably support stator element 30a thereon.

It is to be noted that the rotary joint means 30 heretofore described is interposed between and secured to two axially aligned rotatable water irrigation pipe sections as represented by the proximal ends of pipe elbow 11b and water delivery pipe 12 in FIG. 2. However, provided that the rotary joint means 30 is substantially axially aligned with the rotatable water delivery pipe 12, it is to be understood that the rotary joint means may be constructed to encircle a straight medial or end portion of either the pipe elbow 11b or the water delivery pipe 12, or proximal portions of both the elbow 11b and the pipe 12 may be positioned within and surrounded by the stator and the rotor elements 30a, 30b of rotary joint means 30.

It is apparent that the arrangement of the rotary joint means 30 described hereinbefore ensures that the water distribution pipe 11 may be rotated through several revolutions or to any desired extent about the axis defined by the vertical water delivery pipe 12 without any conduit means between the stationary hydraulic fluid circulating means 25 and the hydraulic fluid operated motor means 17 becoming unintentionally wrapped about the delivery pipe and stretched to an extent such as to rupture the conduit means. Since it follows, therefore, that the hydraulic fluid conveying stator lines 31 should remain stationary during rotation of the water distribution pipe 11 about the water delivery pipe 12, it is apparent that the stator element 30a of rotary joint means 30 preferably should be restrained from rotation with the rotor element 30b by means other than the stator lines 31 per se. Accordingly, a suitable restraining means 40, shown in the form of a chain, may extend between and be attached to the stator element 30a and the supporting stand 20, thus preventing rotation of the stator element 30a in at least that direction in which the water distribution pipe 11 is rotated.

From the foregoing description, it can be appreciated that there is provided an improved conduit means for establishing fluid communication between the hydraulic fluid circulating means 25 and the drive motor means 17 of the circular irrigation system, which conduit means includes rotary joint means 30 encircling the axis of the generally vertical water delivery pipe 12 for conducting hydraulic fluid flow between the circulating means 25 and the drive motor means 17 during rotation of the distribution pipe 11 about the delivery pipe 12.

In the drawings and specification there has been set forth a preferred embodiment of the invention and, although specific terms are employed, they are used in a generic and descriptive sense only and not for puroses of limitation.

That which is claimed is:

1. A circular irrigation system comprising:
 a generally vertical water delivery pipe defining an axis;
 a water distribution pipe extending horizontally from and communicating with said delivery pipe;
 means supporting said distribution pipe for rotation about said axis and including hydraulic fluid operated drive motor means movable with said distribution pipe for motivating rotation thereof;

hydraulic fluid circulating means mounted stationarily relative to said distribution pipe for circulating a flow of hydraulic fluid to said drive motor means; conduit means for establishing fluid communication between said circulating means and said drive motor means and including rotary joint means encircling said axis for conducting hydraulic fluid flow between said circulating means and said drive motor means during rotation of said distribution pipe about said delivery pipe, said rotary joint means comprising a rotor element detachably interposed in said delivery pipe for defining a portion of a water conduit and a stator element encircling said rotor element, said elements being positioned coaxially of each other and coaxially of said water delivery pipe, and means connecting said rotor element to said distribution pipe for rotation therewith about the axis of said delivery pipe, said stator element having a plurality of passageways therein and said rotor element also having a plurality of passageways therein communicating with corresponding passageways in said stator element for conducting hydraulic fluid flow therebetween; and restraining means connected to said stator element for restraining said stator element against rotation.

2. An irrigation system according to claim 1 wherein said delivery pipe has an upper terminal end and further wherein said distribution pipe overlies and extends radially outwardly from said upper terminal end.

3. An irrigation system according to claim 1 wherein said supporting means comprises at least one carriage means underlying said distribution pipe intermediate the length thereof, and said carriage means having a ground engaging wheel coupled to said drive motor means and driven thereby.

4. An irrigation system according to claim 1 wherein said conduit means comprises moving flexible hose means extending along said distribution pipe for establishing communication between said drive motor means and said rotary joint means and stationary flexible hose means extending between said rotary joint means and said circulating means for establishing communication therebetween.

* * * * *

UNITED STATES PATENT AND TRADEMARK OFFICE
CERTIFICATE OF CORRECTION

PATENT NO. : 4,186,763
DATED : Feb. 5, 1980
INVENTOR(S) : George R. Ferguson

It is certified that error appears in the above-identified patent and that said Letters Patent are hereby corrected as shown below:

Column 2, Line 42 after the word "an" insert - upper -

Column 4, Line 22 after the numeral "30" insert - without departing from the invention -

Signed and Sealed this

Twenty-ninth Day of July 1980

[SEAL]

Attest:

SIDNEY A. DIAMOND

Attesting Officer

Commissioner of Patents and Trademarks